(No Model.)
E. L. HOLMES.
PRINTER'S GALLEY.
No. 540,056. Patented May 28, 1895.
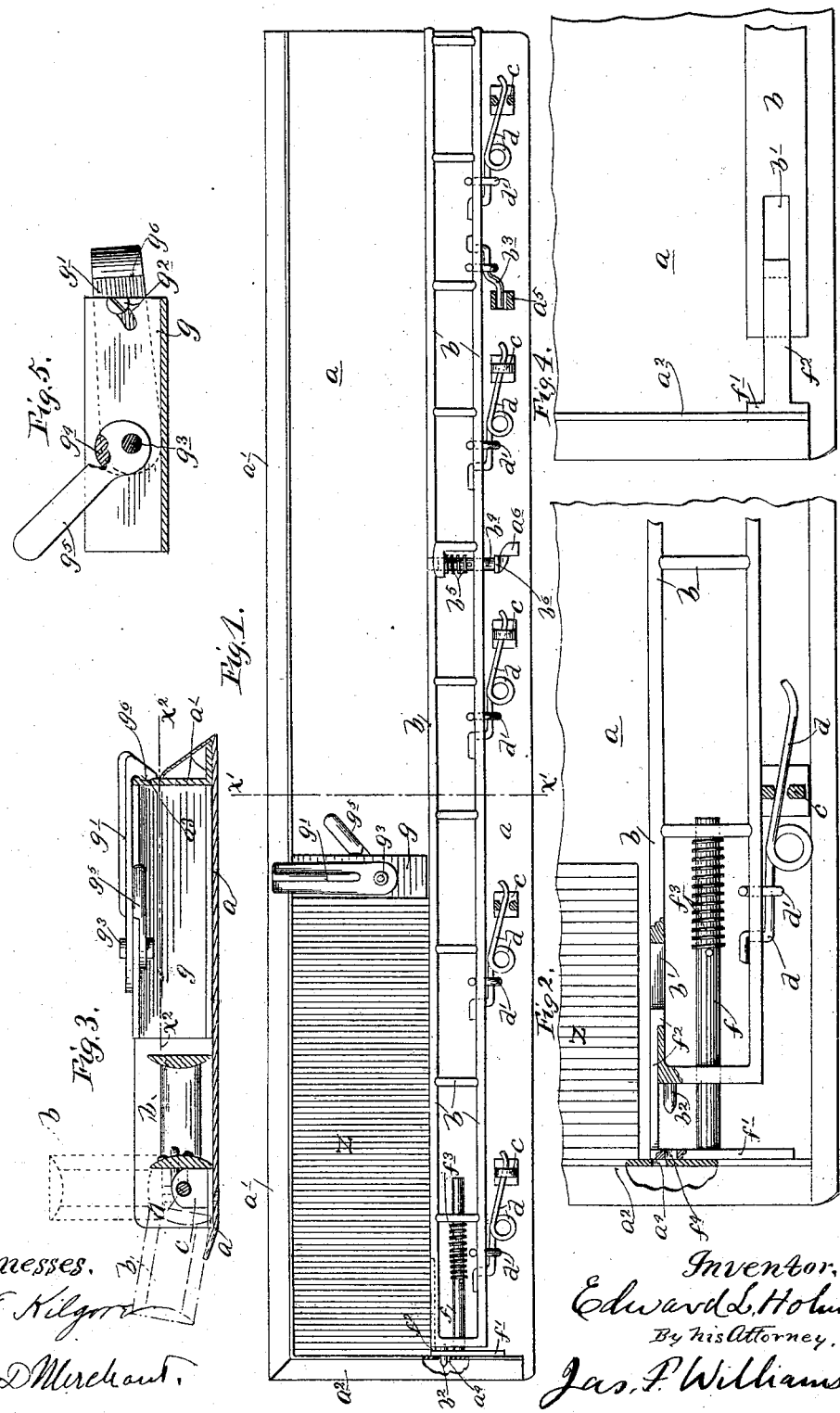

UNITED STATES PATENT OFFICE.

EDWARD L. HOLMES, OF MINNEAPOLIS, ASSIGNOR OF ONE-HALF TO FREDERICK C. NELSON, OF ST. PAUL, MINNESOTA.

PRINTER'S GALLEY.

SPECIFICATION forming part of Letters Patent No. 540,056, dated May 28, 1895.

Application filed February 21, 1895. Serial No. 539,227. (No model.)

*To all whom it may concern:*

Be it known that I, EDWARD L. HOLMES, a citizen of the United States, residing at Minneapolis, in the county of Hennepin and State of Minnesota, have invented certain new and useful Improvements in Printers' Galleys; and I do hereby declare the following to be a full, clear, and exact description of the invention, such as will enable others skilled in the art to which it appertains to make and use the same.

My invention relates to printers' galleys, and has for its object to provide an improved form of the same, both in point of ease and rapidity of manipulation and efficiency in holding the type.

To these ends my invention comprises the novel devices and combinations of devices, the preferred form of which, as well as a modification of the same, are illustrated in the accompanying drawings, wherein, like letters referring to like parts throughout the several views—

Figure 1 is a plan view of the entire device, some parts being broken away. Fig. 2 is a plan view of a portion of the device shown in Fig. 1, some parts being broken away and the clamping-bar being shown as retracted from the type. Fig. 3 is a horizontal section taken on the line $X'X'$ of Fig. 1, looking toward the left. Fig. 4 is a plan view of some of the parts shown in Fig. 2, the clamping-bar being thrown up into the position shown in dotted lines in Fig. 3. Fig. 5 is a horizontal section through the quoin-piece, taken on the line $X^2 X^2$ of Fig. 3.

$a$ represents the bed or bottom-plate, and $a'$ $a^2$ respectively the back and the left end marginal walls or flanges of the galley. These marginal walls $a'$ $a^2$ are formed by angle-bars, which are secured by means of rivets or otherwise to the plate $a$, and the rear bar $a'$ is provided, near its outer upper edge, with a longitudinal depression or valley $a^3$, the purpose of which will later appear.

$b$ represents a clamping-bar which forms the front side wall of the galley. As shown, this bar is of skeleton-like form, and is mounted for an endwise sliding and lateral motion to and from the type, and pivotal motion on its mountings, to throw the bar to its extreme position away from the type. As preferably constructed, the bar is also spring-seated, so that it will clamp the type with a yielding pressure. The above features may be accomplished by the following details:

$c$ represents a series of perforated cam-lugs, rigidly secured to the plate $a$, and $d$ represents a corresponding series of spring-acting cam-rods, one end of each of which rods is secured by a staple $d'$ to the clamping-bar, and the free ends of which work through said cam-lugs $c$. It will be noted that the free ends of these cam-rods $d$ project from the clamping-bar at angle thereto, and that the said clamping-bar, when in its retracted position, as shown in Fig. 2, terminates short of the galley wall $a^2$. Now, as is evident, by giving the clamping-bar $b$ an endwise movement toward the wall $a^2$, said bar will be forced laterally against the type-bars, (shown at Z), by the combined cam and spring action of said cam-rods $d$. The engagement of these rods $d$, with their seat in the lugs $c$, also furnish a pivot joint, on which the clamping-bar may be turned outward out of the way, when removing the type.

To fill up the gap between the end of the clamping-bar and the wall $a^2$, I provide an extensible head, comprising a plunger $f$, mounted in said bar, a foot-piece $f'$, on the outer end of said plunger, and a face-piece $f^2$, projecting from the foot-piece $f'$, and working in a slot $b'$, in said bar $b$, with its forward face in line with the inner face of said bar. The plunger $f$ is under strain from a spring $f^3$, which keeps the foot portion $f'$ always in contact with the wall $a^2$. By this means, the type-bars, which lie close to the wall $a^2$, will be clamped as effectually as will the bars which are clamped by the clamping-bar body. The wall $a^2$ is provided with a perforation $a^4$, and the foot portion $f'$ of the extensible head is provided with a perforation $f^4$, which, when the clamping-bar is forced forward or inward against the type, will register with said perforation $a^4$.

The left end of the clamping-bar is provided with a locking-pin $b^2$ in line with the perforation $f^4$ and foot-piece $f'$, and adapted, when the bar $b$ is moved to its extreme position to the left, to engage through both of said perforations $a^4$ and $f^4$, and thus to lock the clamping-bar against pivotal motion. It will be noted, however, by reference to Fig. 1, that the perforation $a^4$ is slightly elongated, so that when thus engaged, with the bar bearing against the type, this pin $b^2$ is out of engagement with both extremities of the slot, so that under an extreme jar to the galley the bar $b$ may yield slightly on its spring cam-rods. The amount that this bar is permitted to yield is less than the width of the thinnest type.

At the right end of the bar $b$, is a projecting finger $b^3$, which, when the bar is forced to the extreme left, engages in a perforation of a lug $a^5$, rigid on the base-plate $a$. The perforation in this lug $a^5$ is elongated to permit a slight play of the bar, to and from the type, in the same manner as described in connection with the slot $a^4$, in the wall $a^2$. When the bar $b$ is moved to the extreme right, this finger $b^3$ is carried out of engagement with this lug $a^5$.

In order to hold the clamping-bar $b$ to the extreme left, against the action of the spring $f^3$, on the plunger $f$, I provide a locking device, comprising a lock-lug $a^6$, rigid on the plate $a$, and a lock-plunger $b^4$, mounted for sliding movement, in the bar $b$, and normally held outward by a coil spring $b^5$. Both the lug $a^6$ and the outer end of the plunger $b^4$ are beveled, so that in moving the bar $b$ to the left, these parts will be automatically locked. The plunger $b^4$ may be readily released from the lug $a^6$, by placing the finger on the finger-piece $b^6$ of the plunger $b^4$; and on the release of this plunger, as already indicated, the bar $b$ will be automatically forced to the right, into its retracted position, as shown in Fig. 2.

In connection with the device so far described, I employ a clamp-block of novel construction, to-wit: $g$ is an angular or channel-shaped piece of metal, forming the body of the clamp-block, and $g'$ is a sliding jaw, secured to the portion $g$, near its outer end, by a slot-and-screw connection $g^2$, and, at its inner end, by means of a pin $g^3$, carried by an eccentric $g^4$, mounted in the upper flange of said piece $g$. The eccentric $g^4$ is moved by a lever $g^5$, secured thereto. The length of this body section $g$ is slightly less than the width of the lines of type set in the galley so that the clamping-bar may be free to clamp said type. When placed in position, as shown in Figs. 1 and 3, the clamping jaw $g'$ projects and engages over the outer upper edge of the wall $a'$; and it will be noted, that the jaw of the clamp $g'$ has a rounded portion $g^6$, which fits in the valley $a^3$, in said wall $a'$. As is evident, by moving the eccentric $g^4$, the clamping jaw $g'$ may be tightly drawn against the wall $a'$, and the clamp-block secured in any desired position thereon.

It must be obvious, from the foregoing, that a galley, constructed as described may be manipulated with great ease and rapidity, and, at the same time, the type will be held securely, without requiring extreme pressure thereon. In case this galley should be dropped, the type would not be nearly as likely to fall from a place as with the old form of galley, inasmuch as the yielding action of the spring cam-rods, after receiving the jar, would immediately throw the clamping-bar into normal position. Again, when the bar $b$ is thrown to the outward extreme of its pivotal movement, it is entirely clear from and out of the way of the type, affording large clearance for putting in and taking out the same.

In connection with this preferred form, attention is called to the fact, that when the clamping-bar $b$ is turned up, as shown in Figs. 3 and 4, the said clamping-bar, together with the extensible head, may be readily removed by forcing the clamping-bar toward the left, and, at the same time, lifting upward on the same, so as to cause the spring fingers $d$ to yield sufficiently to permit the foot-piece $f'$ of the extensible head to pass over the end wall $a^2$.

What I claim, and desire to secure by Letters Patent of the United States, is as follows:

1. In a printer's galley, the combination with the body of the galley, of a movable clamping-bar, forming one wall thereof, a series of cam-lugs, secured to one of said parts, and a series of spring cam-rods secured to the other of said parts, projecting therefrom, at an angle thereto, and engaging said cam-lugs, whereby, under a longitudinal movement, the clamping-bar will be forced laterally against the type, substantially as described.

2. In a printer's galley, the combination with the body of the galley, of a movable clamping-bar, forming one side thereof, a series of perforated cam-lugs secured to one of said parts, and a series of spring cam-rods, secured to the other of said parts, projecting therefrom, at an angle thereto, and working through the perforations of said cam-lugs, to form a pivot on which the clamping-bar may be turned from working position, substantially as described.

3. In a printer's galley, the combination with the body of the galley, of a movable clamping-bar forming one side wall thereof a series of perforated cam-lugs, secured to one of said parts, a series of spring cam-rods, secured to the other of said parts, projecting therefrom, and engaging through the perforations of said lugs, and the extensible head section carried by said clamping-bar, substantially as and for the purpose set forth.

4. In a printer's galley, the combination with the body of the galley, of a movable clamping-bar forming one side wall thereof, a series of perforated cam-lugs, secured to one of said parts, a series of spring cam-rods, secured to the other of said parts, and working through the perforations of said lugs, and an extensible head section, carried by said clamping-bar, comprising the spring-mounted plunger, the foot-piece on said plunger, and the face-piece carried on said foot-piece, working in a slot in the clamping-bar, substantially as described.

5. In a printer's galley, the combination with the body of the galley, of the clamping-bar, mounted for endwise and pivotal motion, a lock-pin carried by said clamping-bar, engageable with a seat or perforation in the end wall of the galley, on the extreme endwise movement of said bar, whereby, when the bar is pressed against the type, it will be locked against pivotal motion, substantially as described.

6. In a printer's galley, the combination with the body of the galley, of a movable clamping-bar, forming one wall thereof, a series of cam-lugs secured to one of said parts, a series of spring cam-rods, secured to the other of said parts, a spring tending to throw the clamping-bar into its retracted position, and a lock for holding said bar in its clamping position against the action of said spring, comprising the lug $a^6$ on the plate $a$, and the spring-mounted plunger $b^4$ carried by said clamping-bar, substantially as described.

7. The combination with the body of the galley, having fixed thereto the cam-lug $c$, the lock-lug $a^6$ and the perforated lug $a^5$, of the clamping-bar $b$, having secured thereto the spring cam-rods $d$, working through said lug $c$, a spring-mounted plunger $b^4$, engageable with said lock lug $a^6$, the finger $b^3$ engaging the perforation in said lug $a^5$, and the projecting pin $b^2$ engaging the perforation $a^4$ in the wall $a^2$ of said galley, substantially as described.

In testimony whereof I affix my signature in presence of two witnesses.

EDWARD L. HOLMES.

Witnesses:
JAS. F. WILLIAMSON,
E. F. ELMORE.